US012711065B2

(12) United States Patent
Zhang

(10) Patent No.: US 12,711,065 B2
(45) Date of Patent: Aug. 18, 2026

(54) RESOURCE ALLOCATION METHOD AND APPARATUS, ELECTRONIC DEVICE, AND STORAGE MEDIUM

(71) Applicant: SUZHOU METABRAIN INTELLIGENT TECHNOLOGY CO., LTD., Suzhou (CN)

(72) Inventor: Tao Zhang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/469,904

(22) PCT Filed: Dec. 6, 2024

(86) PCT No.: PCT/CN2024/137577

§ 371 (c)(1),
(2) Date: Sep. 26, 2025

(87) PCT Pub. No.: WO2025/189856

PCT Pub. Date: Sep. 18, 2025

(65) Prior Publication Data

US 2026/0119395 A1 Apr. 30, 2026

(30) Foreign Application Priority Data

Mar. 12, 2024 (CN) ........................ 202410281682.1

(51) Int. Cl.
*G06F 12/06* (2006.01)

(52) U.S. Cl.
CPC ................................ *G06F 12/0653* (2013.01)

(58) Field of Classification Search
CPC .................................................. G06F 12/0653

(Continued)

(56) References Cited

U.S. PATENT DOCUMENTS 9,928,884 B1 * 3/2018 Gou ......................... G11C 7/12
2017/0255565 A1 * 9/2017 Mosiolek ........... G06F 12/0238

(Continued)

FOREIGN PATENT DOCUMENTS

CN 110209490 A 9/2019
CN 115686872 A 2/2023

(Continued)

OTHER PUBLICATIONS

Meng Siyuan, et al. "The Architecture of Flexible Shared-memory for Multi-DSP." Microelectronics & Computer. 25(11). Nov. 2008.

*Primary Examiner* — Jared I Rutz
*Assistant Examiner* — Wei Ma
(74) *Attorney, Agent, or Firm* — IPro, PLLC

(57) ABSTRACT

The present disclosure provides a resource allocation method, performed by a memory management unit in a resource allocation system, including: in response to a memory obtaining request forwarded by a switch in the resource allocation system, obtaining a required memory capacity and a memory start address carried by the memory obtaining request; selecting a target memory module that matches the required memory capacity from at least two memory modules in the resource allocation system based on a memory allocation unit in the resource allocation system; and performing address translation on the target memory module based on a memory address router in the memory allocation unit and the memory start address, and allocating the target memory module after the address translation to the target host.

20 Claims, 5 Drawing Sheets

(58) Field of Classification Search
USPC .......................................................... 711/170
See application file for complete search history.

(56) References Cited

U.S. PATENT DOCUMENTS

2022/0413702 A1 12/2022 Liu et al.
2024/0211424 A1* 6/2024 Kim ...................... G11C 5/148
2026/0003726 A1* 1/2026 Ma ...................... G06F 11/0751
2026/0010423 A1* 1/2026 Wang .................... G06F 11/073

FOREIGN PATENT DOCUMENTS

CN 117170882 A 12/2023
CN 117873738 A 4/2024
WO 2017113074 A1 7/2017
WO 2017181853 A1 10/2017

* cited by examiner

RESOURCE ALLOCATION METHOD AND APPARATUS, ELECTRONIC DEVICE, AND STORAGE MEDIUM

CROSS-REFERENCE TO RELATED APPLICATION

The present disclosure claims the priority of Chinese patent application filed on Mar. 12, 2024 before the CNIPA, China National Intellectual Property Administration with the application number of 202410281682.1, and the title of "RESOURCE ALLOCATION METHOD AND APPARATUS, ELECTRONIC DEVICE, AND STORAGE MEDIUM", which is incorporated herein in its entirety by reference.

FIELD

The present disclosure relates to the field of computer storage technology, and more particularly to a resource allocation method and apparatus, an electronic device, and a non-volatile readable storage medium.

BACKGROUND

With the high demand of data center storage and data processing, servers are currently facing bottleneck problems caused by existing memory architectures.

In the related art, a host is often connected with enough compute express link (CXL) memory modules to meet peak business demands, so as to realize memory expansion of the host. However, this method has a high memory usage cost, and a proportion of memory usage is low when a business volume of the host is low, which will cause a waste of memory resources.

SUMMARY

To overcome the problems existing in related art, the present disclosure provides a resource allocation method and apparatus, an electronic device, and a non-volatile readable storage medium.

In a first aspect, the present disclosure provides a resource allocation method, applied to a memory management unit in a resource allocation system. The method includes:

in response to a memory obtaining request forwarded by a switch in the resource allocation system, obtaining a required memory capacity and a memory start address carried by the memory obtaining request, where the memory obtaining request is sent by any target host of at least two hosts included in the resource allocation system to the switch;

selecting a target memory module that matches the required memory capacity from at least two memory modules in the resource allocation system based on a memory allocation unit in the resource allocation system; and performing address translation on the target memory module based on a memory address router in the memory allocation unit and the memory start address, and allocating the target memory module after the address translation to the target host.

In some embodiments of the present disclosure, the at least two hosts are respectively connected to at least two host memory interfaces in the memory allocation unit in one-to-one correspondence based on a compute express link (CXL) bus, and memory device interfaces in the memory allocation unit are connected to a memory storage unit in the resource allocation system based on the CXL bus.

In some embodiments of the present disclosure, the memory storage unit includes at least two memory modules and at least two memory expander controllers (MXCs), the at least two MXCs are connected to the at least two memory modules in one-to-one correspondence, and the at least two MXCs are configured to perform memory expansion on the at least two memory modules.

In some embodiments of the present disclosure, the memory management unit is connected to a status obtaining interface in the memory allocation unit based on a universal asynchronous receiver/transmitter (UART), where the method further includes:

obtaining temperature information corresponding to the memory allocation unit based on the status obtaining interface.

In some embodiments of the present disclosure, the method further includes:

in response to the temperature information satisfying a preset temperature condition, sending a first target signal to a target fan in the resource allocation system based on a logic unit in the resource allocation system, where the first target signal is configured to obtain rotational speed information corresponding to the target fan; and sending a second target signal to the target fan based on the rotational speed information and the temperature information, where the second target signal is configured to adjust a rotational speed of the target fan.

In some embodiments of the present disclosure, selecting the target memory module that matches the required memory capacity from the at least two memory modules in the resource allocation system based on the memory allocation unit in the resource allocation system includes:

obtaining memory allocation status corresponding to respective memory modules in the resource allocation system based on the memory allocation unit in the resource allocation system;

determining one or more memory modules to be allocated and free memory sizes corresponding to the one or more memory modules to be allocated based on the memory allocation status corresponding to the respective memory modules; and in response to a free memory size of a first memory module in the one or more memory modules to be allocated being greater than or equal to the required memory capacity, determining the first memory module as the target memory module.

In some embodiments of the present disclosure, selecting the target memory module that matches the required memory capacity from the at least two memory modules in the resource allocation system based on the memory allocation unit in the resource allocation system further includes:

in response to a memory size of any one of the one or more memory modules to be allocated being less than the required memory capacity, determining designated memory modules as the target memory module, where the designated memory modules include at least two memory modules to be allocated.

In some embodiments of the present disclosure, performing the address translation on the target memory module based on the memory address router in the memory allocation unit and the memory start address includes:

obtaining an initial start address, an initial end address, and a target memory size corresponding to the target memory module;

determining a target end address based on the target memory size and the memory start address through the memory address router; and translating the initial start address to the memory start address, and translating the initial end address to the target end address.

In some embodiments of the present disclosure, the memory obtaining request carries a host identifier, where allocating the target memory module after the address translation to the target host includes:

determining a target host memory interface connected to the target host from at least two host memory interfaces in the memory allocation unit based on the host identifier; and in response to the memory address router completing the address translation of the target memory module, sending the memory start address and the target end address to the target host memory interface through the memory address router.

In some embodiments of the present disclosure, each of the at least two hosts in the resource allocation system is respectively connected to a target processor through a two-wire serial bus, and the target processor stores a host identifier corresponding to the host connected to the target processor.

In some embodiments of the present disclosure, the memory management unit is connected to a configuration interface in the memory allocation unit through a two-wire serial bus, where the method further includes:

uniformly addressing the at least two memory modules based on the configuration interface.

In some embodiments of the present disclosure, the method further includes:

controlling an initialization unit in the memory allocation unit to perform initialization configuration according to information in a storage processor based on the configuration interface.

In some embodiments of the present disclosure, the memory management unit is connected to a memory resource interface in the memory allocation unit based on a high-speed serial computer expansion bus, where obtaining the memory allocation status corresponding to the respective memory modules in the resource allocation system based on the memory allocation unit in the resource allocation system includes:

obtaining the memory allocation status corresponding to the respective memory modules in real time based on the memory resource interface.

In some embodiments of the present disclosure, the memory allocation status includes host information, bandwidth information, and device interface connection status corresponding to one or more allocated memory modules, and the free memory sizes corresponding to the one or more memory modules to be allocated.

In some embodiments of the present disclosure, the target host is configured to send the memory obtaining request to the switch in response to a storage module corresponding to the target host doing not satisfy a preset storage condition.

In some embodiments of the present disclosure, controlling the initialization unit in the memory allocation unit to perform initialization configuration according to the information in the storage processor based on the configuration interface includes:

in response to power-on of the memory allocation unit being completed, controlling the initialization unit to obtain initialization information from the storage processor based on the configuration interface; and based on the initialization information, enabling host memory interfaces and memory device interfaces in the memory allocation unit, and setting transmission bandwidth information and transmission rate information.

In some embodiments of the present disclosure, the memory start address is determined based on a storage size of a storage module corresponding to the target host.

In a second aspect, the present disclosure provides a resource allocation apparatus, including:

a first obtaining module, configured to, in response to a memory obtaining request forwarded by a switch in the resource allocation system, obtain a required memory capacity and a memory start address carried by the memory obtaining request, where the memory obtaining request is sent by any target host of at least two hosts included in the resource allocation system to the switch;

a first selection module, configured to select a target memory module that matches the required memory capacity from at least two memory modules in the resource allocation system based on a memory allocation unit in the resource allocation system; and a first allocation module, configured to perform address translation on the target memory module based on a memory address router in the memory allocation unit and the memory start address, and allocate the target memory module after the address translation to the target host.

In a third aspect, the present disclosure provides a resource allocation system, including a memory management unit, a memory allocation unit, a memory storage unit, a switch, and at least two hosts;

where the at least two hosts are connected to the switch based on a network, and the at least two hosts are respectively connected to at least two host memory interfaces in the memory allocation unit in one-to-one correspondence based on a compute express link (CXL) bus;

memory device interfaces in the memory allocation unit are connected to the memory storage unit based on the CXL bus;

the memory management unit is connected to the switch based on the network; the memory management unit is connected to a status obtaining interface in the memory allocation unit based on a universal asynchronous receiver/transmitter (UART), the memory management unit is connected to a configuration interface in the memory allocation unit based on a two-wire serial bus, and the memory management unit is further connected to a memory resource interface in the memory allocation unit based on a high-speed serial computer expansion bus.

In a fourth aspect, the present disclosure provides an electronic device, including one or more processors, one or more memories, and a computer program stored on the one or more memories and executable on the one or more processors, where the computer program, when executed by the one or more processors, causes the electronic device to perform the resource allocation method in any one embodiment of the first aspect.

In a fifth aspect, the present disclosure provides a non-volatile readable storage medium, where instructions in the non-volatile readable storage medium, when executed by a processor of an electronic device, cause the electronic device to perform the resource allocation method in any one embodiment of the first aspect.

In the embodiments of the present disclosure, in response to the memory obtaining request sent by the target host forwarded by the switch in the resource allocation system, the memory management unit in the resource allocation system obtains the required memory capacity and the memory start address carried by the memory obtaining request, selects the target memory module that matches the required memory capacity from the at least two memory modules in the resource allocation system based on the memory allocation unit in the resource allocation system, performs address translation on the target memory module based on the memory address router in the memory allocation unit and the memory start address, and allocates the target memory module after the address translation to the target host, so as to achieve dynamic resource allocation to the target host. In this way, through the interaction between the memory management unit and the memory allocation unit in the resource allocation system, the rapid allocation of free memory modules in the system may be ensured. Moreover, based on actual memory requirements of the target host, the target memory module that matches the required memory capacity may be determined for the target host, and the target memory module may be allocated to the target host, achieving dynamic allocation of memory resources in the resource allocation system while improving utilization rate of memory resources in the resource allocation system and reducing the use cost of the memory resources.

BRIEF DESCRIPTION OF THE DRAWINGS

In order to more clearly illustrate the technical solution in the embodiments of the present disclosure or the prior art, the accompanying drawings required for the description of the embodiments or the prior art will be briefly introduced below. Obviously, the drawings described below are some examples of the present disclosure, and other drawings can be obtained according to these drawings without creative labor for those skilled in the art.

DETAILED DESCRIPTION

The technical solution in the embodiments of the present disclosure will be clearly and completely described as below with reference to the accompanying drawings in the embodiments of the present disclosure. Obviously, the described embodiments are only a part of the embodiments of the present disclosure, but not all of them. Based on the embodiments in the present disclosure, all other embodiments obtained by those skilled in the art without creative labor are within the protection scope of the present disclosure.

Figure 1:
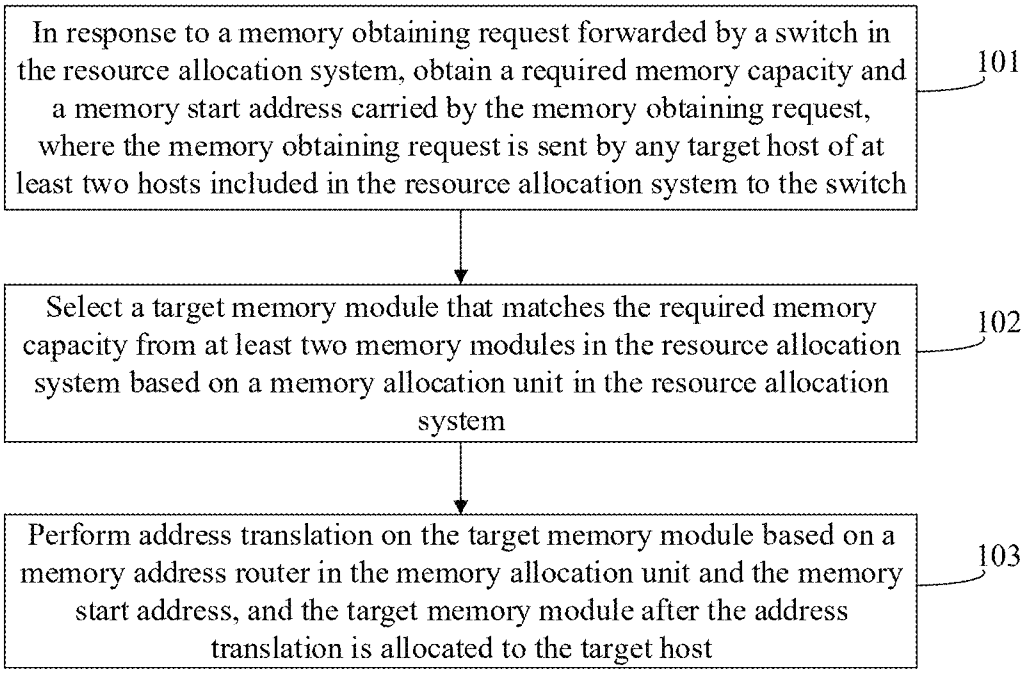
FIG. 1 is a flowchart of a resource allocation method provided in an embodiment of the present disclosure.

FIG. 1 is a flowchart of a resource allocation method provided in an embodiment of the present disclosure, applied to a memory management unit in a resource allocation system.

In the embodiment of the present disclosure, the resource allocation system can be used to realize dynamic allocation of memory resources. The resource allocation system can be placed on an entire server cabinet and interconnected through cables for easy deployment. The resource allocation system can include at least two hosts, a switch, a memory management unit, a memory allocation unit, and a memory storage unit. The switch can be a compute express link (CXL) switch, for example, a general physical network switch. The memory management unit can be a baseboard management controller (BMC) memory management unit. That is, the memory management unit uses the BMC to manage the entire resource allocation system, including monitoring of memory resource status, configuration of the memory allocation unit and the like.

The memory allocation unit can be a CXL memory allocation unit, which is used for memory status monitoring and memory allocation. Specifically, the memory allocation unit can include modules such as one or more host memory interfaces, memory address routers, memory address allocation units, memory device interfaces, status obtaining interfaces, memory resource interfaces, configuration interfaces, initialization units. The memory storage unit can be a CXL memory storage unit. The memory storage unit can include one or more memory expander controllers (MXCs) and memory modules (for example, CXL memory modules (CMMs)). For example, the memory modules can be in a form of E1.S, E3.S, or peripheral component interconnect express (PCIe) standard card. The memory storage unit can include at least two memory modules and at least two MXCs. Each of the at least two MXCs can be connected to a memory module. The MXCs are used to provide high-speed interconnection with high bandwidth and low latency for processors and CXL protocol based devices (memory modules) in the hosts to achieve memory expansion of the memory modules.

In the resource allocation system, the at least two hosts are respectively connected to at least two host memory interfaces set in the memory allocation unit based on a CXL bus. That is, the host memory interface in the memory allocation unit is connected to one host. Meanwhile, the memory device interfaces configured in the memory allocation unit are connected to the memory storage unit in the resource allocation system based on the CXL bus. Specifically, the memory device interfaces in the memory allocation unit can be connected to the MXCs in the memory storage unit in one-to-one correspondence based on the CXL bus.

Each host is equipped with a near-end memory. That is, each host corresponds to a storage module, which is used to meet basic system requirements of the host, ensuring the normal use of the system and rapid transmission of hot data. For example, the storage module can be a dual inline memory module (DIMM). Specifically, the host can be connected to the DIMM based on a double data rate SDRAM (DDR).

Meanwhile, each host can be connected to a target processor through a two-wire serial bus (inter-integrated circuit, I2C). The target processor can store a host identifier corresponding to the host connected to the target processor. That is, for any host in the resource allocation system, the host identifier and related information corresponding to the host are stored in the target processor connected to the host. In this way, when the host is powered on, the processor in the host will automatically read the host identifier in the target processor and bind it with the host. When the host sends a memory obtaining request carrying the host identifier, the memory management unit can determine the host that sends the memory obtaining request, avoiding the loss of the corresponding relationship between the host and the host identifier due to power failure of the host, which may affect subsequent resource allocation. For example, the target processor can be an EEPROM processor. The host identifier can be a hexadecimal number, for example, 0x00, 0x01, 0x02, 0x03, etc. It can be understood that the embodiments of the present disclosure do not limit this.

As shown in FIG. 1, the method may include steps 101 to 102.

In step 101, in response to a memory obtaining request forwarded by a switch in the resource allocation system, a required memory capacity and a memory start address carried by the memory obtaining request are obtained, where the memory obtaining request is sent by any target host of at least two hosts included in the resource allocation system to the switch.

In the embodiment of the present disclosure, if the storage module configured by any target host among the at least two hosts does not satisfy a preset storage condition, the memory obtaining request will be sent to the switch through a network. The memory obtaining request carries the host identifier corresponding to the target host, a memory resource capacity required by the target host, i.e., the required memory capacity, and the memory start address. The memory start address is determined based on a storage size of the storage module corresponding to the target host. For example, it is assumed the storage size of the storage module is 64 GB, an address range of the storage module is 0x00000000 to 0x107fffffff, and the CXL memory start address required by the target host needs to be increased by 1 on the basis of an end address of the storage module, that is, 0x1080000000. The preset storage condition can be that the storage module does not have a capability to provide required memory resources to the target host. For example, the remaining free memory of the storage module is less than the memory resource capacity required by the target host, that is, the required memory capacity, etc.

When any target host in the resource allocation system sends a memory obtaining request to the switch, the switch will forward the memory obtaining request to the memory management unit, where the switch is connected to the memory management unit through a network. When the memory management unit receives the memory obtaining request, in response to the memory obtaining request, the memory management unit parses the memory obtaining request to obtain the host identifier, the required memory capacity, and the memory start address carried by the memory obtaining request.

In step 102, a target memory module that matches the required memory capacity is selected from at least two memory modules in the resource allocation system based on a memory allocation unit in the resource allocation system.

In the embodiment of the present disclosure, based on the memory allocation unit in the resource allocation system, the target memory module that matches the required memory capacity is selected from the at least two memory modules in the resource allocation system. For example, the memory allocation unit determines free memory modules by obtaining the storage status of the at least two memory modules, and selects the target memory module that matches the required memory capacity of the target host from the free memory modules. The target memory module that matches the required memory capacity of the target host can have a memory capacity greater than or equal to the required memory capacity.

In step 103, address translation is performed on the target memory module based on a memory address router in the memory allocation unit and the memory start address, and the target memory module after the address translation is allocated to the target host.

In the embodiment of the present disclosure, since the memory address corresponding to the target host needs to be a continuous address, it is necessary to perform address translation based on the memory address and an initial address of the target memory module through the memory address router in the memory allocation unit, and allocate the target memory module after the address translation to the target host for use through the host memory interface in the memory allocation unit.

In summary, in the embodiment of the present disclosure, in response to the memory obtaining request sent by the target host forwarded by the switch in the resource allocation system, the memory management unit in the resource allocation system obtains the required memory capacity and the memory start address carried by the memory obtaining request, selects the target memory module that matches the required memory capacity from the at least two memory modules in the resource allocation system based on the memory allocation unit in the resource allocation system, performs address translation on the target memory module based on the memory address router in the memory allocation unit and the memory start address, and allocates the target memory module after the address translation to the target host, so as to achieve dynamic resource allocation to the target host. In this way, through the interaction between the memory management unit and the memory allocation unit in the resource allocation system, the rapid allocation of free memory modules in the system may be ensured. Moreover, based on actual memory requirements of the target host, the target memory module that matches the required memory capacity may be determined for the target host, and the target memory module may be allocated to the target host, achieving dynamic allocation of memory resources in the resource allocation system while improving utilization rate of memory resources in the resource allocation system and reducing the use cost of the memory resources.

In some embodiments of the present disclosure, the memory management unit in the resource allocation system is connected to a status obtaining interface in the memory allocation unit based on a universal asynchronous receiver/transmitter (UART). The status obtaining interface is used to monitor the memory allocation unit.

An embodiment of the present disclosure may include step 201.

In step 201, temperature information corresponding to the memory allocation unit is obtained based on the status obtaining interface.

In the embodiment of the present disclosure, due to the possibility of temperature rise during the operation of the memory allocation unit, it is necessary to monitor the temperature of the memory allocation unit in real time to ensure the performance of the memory allocation unit. The memory management unit can monitor the temperature status of the memory allocation unit in real time based on the status obtaining interface in the memory allocation unit, and obtain the temperature information corresponding to the memory allocation unit.

In the embodiment of the present disclosure, through the status obtaining interface in the memory allocation unit, the memory management unit can monitor the temperature of the memory allocation unit in real time to avoid performance problems of the memory allocation unit.

In some embodiments of the present disclosure, the resource allocation system may include a logic unit and a target fan. An embodiment of the present disclosure may include steps 301 and 302.

In step 301, in response to the temperature information satisfying a preset temperature condition, a first target signal is sent to the target fan in the resource allocation system based on the logic unit in the resource allocation system, where the first target signal is configured to obtain rotational speed information corresponding to the target fan.

In the embodiment of the present disclosure, when the temperature information satisfies the preset temperature condition, it indicates that the current temperature of the memory allocation unit may affect the performance of the memory allocation unit. Therefore, the memory allocation unit can be cooled down by adjusting a fan speed. The memory management unit can be connected to the logic unit in the resource allocation system through a two-wire serial bus (inter-integrated circuit, I2C). The logic unit can be a complex programmable logic device (CPLD). The memory management unit can send the first target signal to the target fan in the resource allocation system based on the logic unit in the resource allocation system. For example, the memory management unit can send a fan adjustment command to the logic unit, and upon receiving the fan adjustment command, the logic unit can send the first target signal to the target fan. The first target signal is used to obtain the current rotational speed information corresponding to the target fan. For example, the first target signal can be a tachometer (TACH) signal. The TACH signal is an output pulse signal whose frequency is proportional to the rotational speed of the fan. The higher the fan speed, the higher the frequency of the TACH signal. Therefore, by measuring the frequency of the TACH signal, the current fan speed can be determined and the rotational speed information corresponding to the target fan can be obtained.

In step 302, a second target signal is sent to the target fan based on the rotational speed information and the temperature information, where the second target signal is configured to adjust the rotational speed of the target fan.

In the embodiment of the present disclosure, the second target signal is sent to the target fan based on the rotational speed information and the temperature information. The second target signal is used to adjust the rotational speed of the target fan, for example, the second target signal can be a pulse-width modulation (PWM) signal. The PWM signal is a pulse signal with a constant frequency. The logic unit can adjust a duty ratio by sending the second target signal to the target fan, thereby adjusting the fan speed of the target fan to improve the heat dissipation effect of the memory allocation unit. For example, a rotational speed difference that needs to be adjusted can be determined based on the temperature information corresponding to the memory allocation unit and a target temperature. The second target signal is generated based on the rotational speed difference and the rotational speed information. The second target signal can adjust the rotational speed of the target fan by adjusting the duty ratio.

In the embodiment of the present disclosure, the rotational speed of the target fan can be adjusted through the memory management unit to ensure the performance of the memory allocation unit.

In some embodiments of the present disclosure, step 102 may include steps 401 to 404.

In step 401, memory allocation status corresponding to respective memory modules in the resource allocation system is obtained based on the memory allocation unit in the resource allocation system.

In the embodiment of the present disclosure, the memory allocation status corresponding to the respective memory modules in the memory storage unit can be obtained based on the memory allocation unit in the resource allocation system. The memory allocation status can include allocated and to be allocated. Correspondingly, the memory modules can be divided into one or more allocated memory modules and one or more memory modules to be allocated. The memory allocation status can include host information (including host identifiers, etc.), bandwidth information, and device interface connection status corresponding to the allocated memory modules, and free memory sizes corresponding to the memory modules to be allocated. It can be understood that the memory allocation status can obtain different information according to user requirements, and the embodiments of the present disclosure do not limit the memory allocation status.

In some embodiments of the present disclosure, the memory management unit is connected to a memory resource interface in the memory allocation unit based on a high-speed serial computer expansion bus.

Step 401 may include step 4011.

In step 4011, the memory allocation status corresponding to the respective memory modules is obtained in real time based on the memory resource interface.

In the embodiment of the present disclosure, the high-speed serial computer expansion bus may be a PCIe Gen1 x2 bus. That is, the memory management unit may be connected to the memory resource interface in the memory allocation unit through a set of PCIe Gen1 x2 buses to obtain usage status of memory resources (including the memory allocation status corresponding to the memory modules) in real time. Therefore, when the target host sends a memory obtaining request signal, the memory management unit will obtain the memory allocation status corresponding to the memory device based on the memory resource interface in the memory allocation unit, so as to allocate idle memory resources to the target host.

In step 402, one or more memory modules to be allocated and free memory sizes corresponding to the one or more memory modules to be allocated are determined based on the memory allocation status corresponding to the respective memory modules.

In the embodiment of the present disclosure, based on the obtained memory allocation status corresponding to the respective memory modules, the current free memory modules to be allocated and the free memory sizes corresponding to the respective memory modules to be allocated are determined.

In step 403, in response to a free memory size of a first memory module in the one or more memory modules to be allocated being greater than or equal to the required memory capacity, the first memory module is determined as the target memory module.

In the embodiment of the present disclosure, if there is the first memory module with a free memory size greater than or equal to the required memory capacity among the memory modules to be allocated, it indicates that the target memory module can provide the memory size that meets requirements of the host, and the first memory module can be directly determined as the target memory module. It can be understood that in a case where there are a plurality of first memory modules in the memory modules to be allocated, a first memory module corresponding to the smallest first difference can be determined as the target memory module based on a first difference between an actual capacity of each first memory module and the required memory capacity.

In step 404: in response to a memory size of any one of the one or more memory modules to be allocated being less than the required memory capacity, designated memory modules are determined as the target memory module, where the designated memory modules include at least two memory modules to be allocated.

In the embodiment of the present disclosure, if the memory size of any memory module to be allocated is smaller than the required memory capacity, it indicates that there is no single memory module to be allocated that meets the required memory capacity. A single memory module to be allocated cannot provide sufficient memory size to the host, and at least two memory blocks to be allocated can be combined and allocated to meet the required memory capacity required by the host. Specifically, at least two memory modules to be allocated whose sum of memory sizes is greater than or equal to the required memory capacity can be selected, namely the designated memory modules, and determined as the target memory module.

In the embodiment of the present disclosure, by selecting a memory module to be allocated that is greater than or equal to the required memory capacity as the target memory module, a matching memory module can be selected as the target memory module while avoiding resource waste. Moreover, in the case where the memory size of a single memory module to be allocated is all smaller than the required memory capacity, the target memory module is determined by combining the memory modules to be allocated, which makes the resource allocation manner in the resource allocation system more flexible and diversified.

In some embodiments of the present disclosure, the memory management unit is connected to a configuration interface in the memory allocation unit through a two-wire serial bus (inter-integrated circuit, I2C).

In the embodiment of the present disclosure, the configuration interface in the memory allocation unit is used to control initialization of the memory allocation unit, unified addressing of memory addresses, and routing of the memory addresses. The configuration interface can be connected to an initialization unit in the memory allocation unit to control the initialization unit to initialize the memory allocation unit. The configuration interface can also be connected to a memory address allocation unit in the memory allocation unit to control the memory address allocation unit to address the at least two memory modules uniformly. The configuration interface can also be connected to the memory address router in the memory allocation unit, so as to control the memory address router to allocate the designated target memory module to the target host by using the mutual cooperation of memory address allocation and memory address routing An embodiment of the present disclosure may include step 501.

In step 501, the at least two memory modules are uniformly addressed based on the configuration interface.

In the embodiment of the present disclosure, the memory management unit controls the configuration interface through the two-wire serial bus, and then controls the memory address allocation unit in the memory allocation unit to uniformly address the at least two memory modules in the memory storage unit through the configuration interface. For example, it is assumed that the memory storage unit includes two memory modules, both of which are 64 GB, a memory address range corresponding to memory module 1 is 0x0 to 0x107fffffff, and the address range of memory module 2 is 0x1080000000-0x207fffffff.

In the embodiment of the present disclosure, the at least two memory modules are uniformly addressed through the configuration interface, facilitating resource allocation of the at least two memory modules by the resource allocation system.

In some embodiments of the present disclosure, step 103 may include steps 601 to 603.

In step 601, an initial start address, an initial end address, and a target memory size corresponding to the target memory module are obtained.

In the embodiment of the present disclosure, after determining the target memory module, the initial start address, the initial end address, and the target memory size corresponding to the target memory module are obtained. The initial start address and the initial end address corresponding to the target memory module can be address information corresponding to the uniformly addressed target memory module. The target memory size is an actual available memory capacity corresponding to the target memory module.

In step 602, a target end address is determined based on the target memory size and the memory start address through the memory address router.

In step 603, the initial start address is translated to the memory start address, and the initial end address is translated to the target end address.

In the embodiment of the present disclosure, address translation is performed on the target memory module through the memory address router. Specifically, the target end address can be determined based on the target memory size and the memory start address. The target end address is a termination address corresponding to the target memory module after the address translation. For example, the target end address corresponding to the target memory module can be determined based on the memory start address and in combination with the target memory size corresponding to the target memory module. The initial start address corresponding to the target memory module is translated to the memory start address, and the initial end address corresponding to the target memory module is translated to the target end address. That is, the memory address range corresponding to the target memory module after the address translation is from the memory start address to the target end address.

In the embodiment of the present disclosure, the address translation of the target memory module is realized through the memory address router, so that the allocation of memory resources can be quickly realized.

In some embodiments of the present disclosure, step 103 may include steps 701 and 702.

In step 701, a target host memory interface connected to the target host is determined from at least two host memory interfaces in the memory allocation unit based on the host identifier.

In the embodiment of the present disclosure, the at least two hosts in the resource allocation system each correspond to a unique host identifier. After the memory allocation unit determines the target memory module to be allocated to the target host, the target memory module needs to be allocated to the corresponding target host based on the at least two host memory interfaces in the memory allocation unit. The host identifier carried in the memory obtaining request received by the memory management unit is obtained, and the memory allocation unit can determine the target host memory interface connected to the target host from the at least two host memory interfaces based on the host identifier.

In step 702, in response to the memory address router completing the address translation of the target memory module, the memory start address and the target end address are sent to the target host memory interface through the memory address router.

In the embodiment of the present disclosure, when the memory address router in the memory allocation unit completes the address translation of the target memory module, it indicates that the target memory module can be allocated to the corresponding target host. Therefore, the memory start address and the target end address after the address translation can be sent to the target host memory interface by the memory address router to achieve memory resource allocation to the target host.

In the embodiment of the present disclosure, the address translation is performed on the target memory module through the memory address router, and the target memory module after the address translation is allocated to the target host through the target host memory interface corresponding to the target host, so that the memory address of the target host remains continuous.

An embodiment of the present disclosure may include step 801.

In step 801, the initialization unit in the memory allocation unit is controlled to perform initialization configuration according to information in a storage processor based on the configuration interface.

In the embodiment of the present disclosure, the configuration interface in the memory allocation unit can control the initialization unit in the memory allocation unit to perform initialization configuration on the memory allocation unit. Based on the configuration interface, the initialization unit is controlled to obtain initialization information stored in the storage processor, and perform the initialization configuration on the memory allocation unit based on the initialization information. The storage processor can be a FLASH processor, and the initialization information can be initialization content pre-stored in the storage processor. For example, the initialization unit can be connected to the storage processor based on a serial peripheral interface (SPI).

In some embodiments of the present disclosure, step 801 may include steps 8011 and 8012.

In step 8011, in response to power-on of the memory allocation unit being completed, the initialization unit is controlled to obtain initialization information from the storage processor based on the configuration interface.

In the embodiment of the present disclosure, when the power-on of the memory allocation unit is completed, the initialization unit obtains the initialization information from the storage processor. The initialization information may include parameter configuration information corresponding to the memory allocation unit, interface enable information and the like.

In step 8012, based on the initialization information, host memory interfaces and memory device interfaces in the memory allocation unit are enabled, and transmission bandwidth information and transmission rate information are set.

In the embodiment of the present disclosure, based on the initialization information, respective host memory interfaces and respective memory device interfaces in the memory allocation unit are enabled, and initialization settings of the transmission bandwidth information and the transmission rate information of the memory allocation unit are performed.

In the embodiment of the present disclosure, the memory management unit controls the initialization unit to perform initialization settings on the memory allocation unit through the configuration interface of the memory allocation unit, ensuring the performance of the memory allocation unit.

Figure 2:
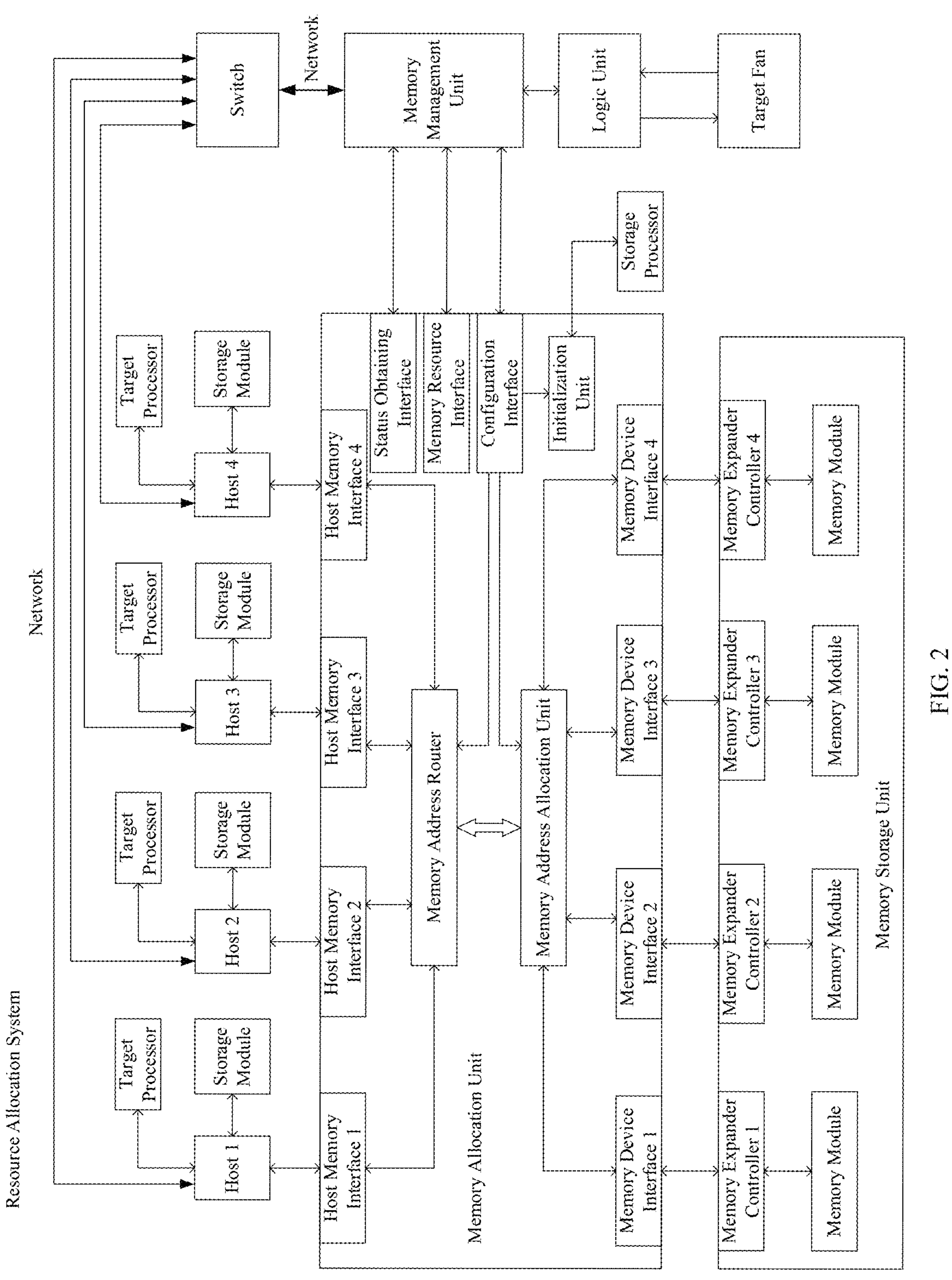
FIG. 2 is a schematic architectural diagram of a resource allocation system provided in an embodiment of the present disclosure.

In an example, FIG. 2 shows a schematic architectural diagram of a resource allocation system. As shown in FIG. 2, the resource allocation system includes four hosts, a switch, a memory management unit, a memory allocation unit, and a memory storage unit. The four hosts are respectively connected to the four host memory interfaces in one-to-one correspondence based on CXLs. Each host is connected to a storage module and a target processor. The host and the storage module are connected based on a DDR. The host and the target processor are connected based on an I2C. Each host is connected to the switch based on a network and sends a memory obtaining request to the switch through the network. The switch then sends the memory obtaining request to the memory management unit through the network. The memory management unit can be connected to a status obtaining interface based on a UART, connected to a memory resource interface based on a PCIe Gen1 x2 bus, and connected to a configuration interface and a logic unit based on an I2C. In response to the memory obtaining request, the memory management unit obtains the memory allocation status corresponding to the memory modules based on the memory resource interface. The memory management unit obtains temperature information corresponding to the memory allocation unit based on the status obtaining interface, and can control a rotational speed of a target fan based on the logic unit to adjust the temperature of the memory allocation unit. The memory management unit can control an initialization unit based on the configuration interface to perform initialization configuration on the memory allocation unit based on initialization information stored in a storage processor. The memory management unit can control a memory address allocation unit based on the configuration interface to uniformly address memory addresses of the four memory modules. The memory management unit can also control a memory address router to perform address translation on an address of a target memory module based on the configuration interface. Four memory device interfaces in the memory allocation unit are respectively connected to memory expander controllers (MXCs) in the memory storage unit in one-to-one correspondence based on CXLs, and each MXC is connected to a memory module. The memory address router connects to the host memory interfaces upwards and receives memory address information from the memory address allocation unit downwards. Therefore, one or more designated memory modules can be allocated to the designated host by using the mutual cooperation of memory address allocation and memory address routing.

Figure 3:
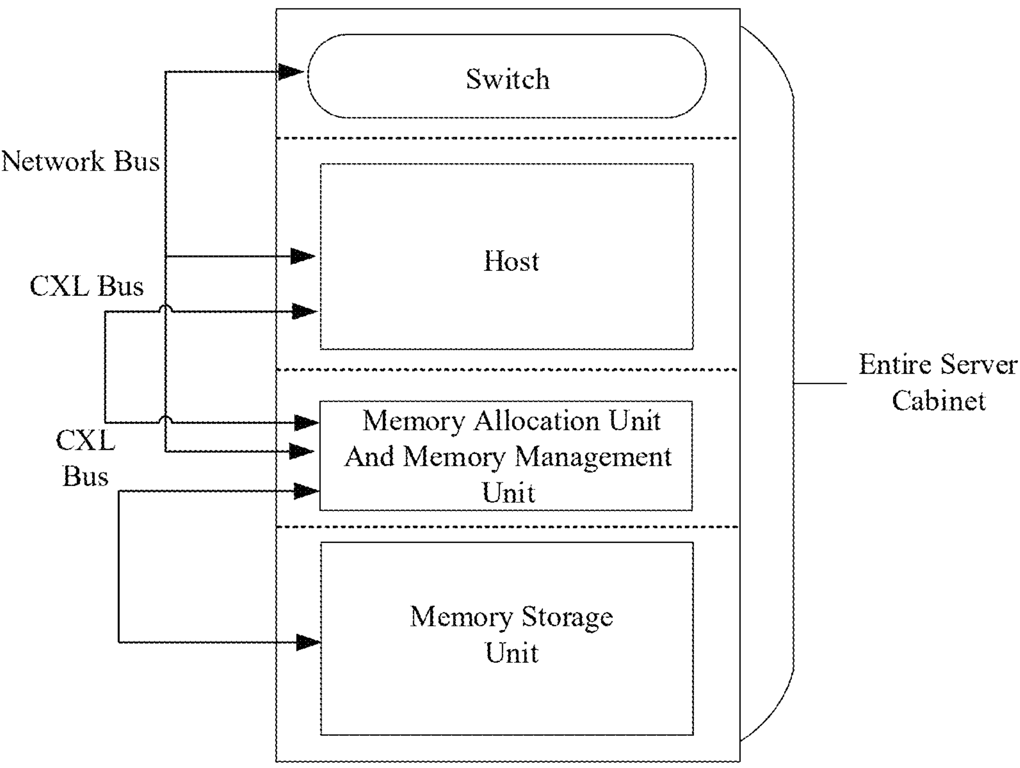
FIG. 3 is a schematic architectural diagram of an entire server cabinet provided in an embodiment of the present disclosure.

Further, FIG. 3 shows a schematic architectural diagram of an entire server cabinet. As shown in FIG. 3, the entire server cabinet includes a switch, a memory allocation unit, a memory management unit, and a memory storage unit. The switch is connected to a host based on a network bus. The switch is connected to the memory allocation unit and the memory management unit based on the network bus. The host is connected to the memory allocation unit and the memory management unit based on a compute high-speed link (CXL) bus. The memory allocation unit and the memory management unit are connected to the memory storage unit based on a CXL bus.

Figure 4:
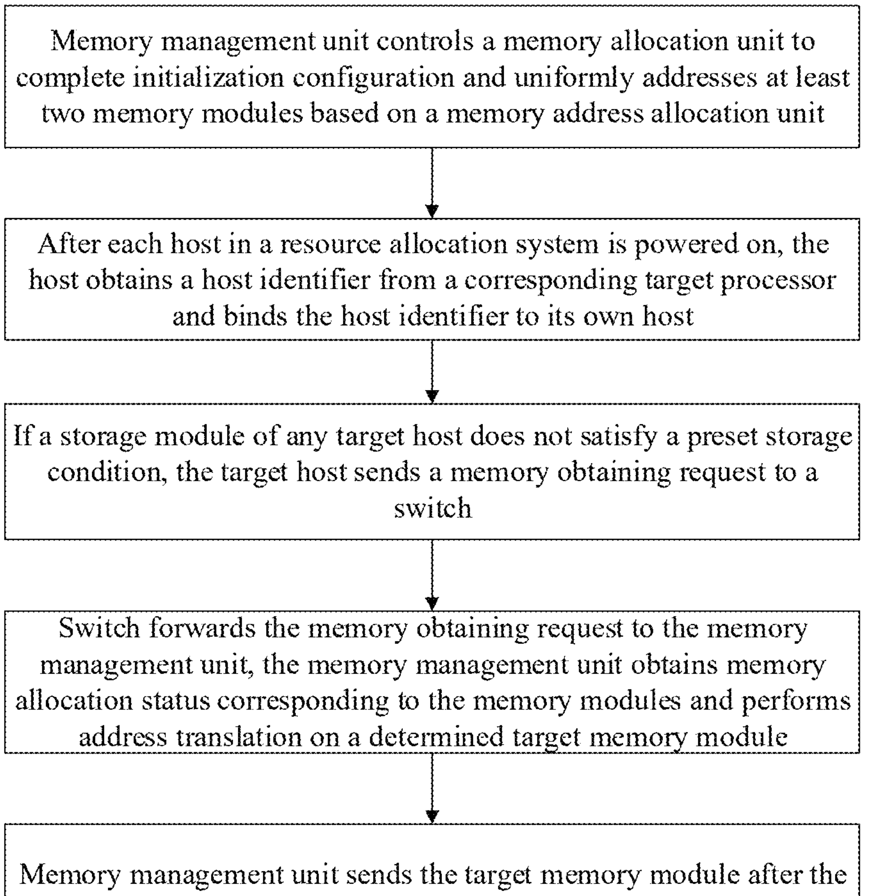
FIG. 4 is a flowchart of specific steps of a resource allocation method provided in an embodiment of the present disclosure.

In an example, FIG. 4 shows a flowchart of specific steps of a resource allocation method. As shown in FIG. 4, a memory management unit controls a memory allocation unit to complete initialization configuration and uniformly addresses at least two memory modules based on a memory address allocation unit. After each host in a resource allocation system is powered on, the host obtains a host identifier from a corresponding target processor and binds the host identifier to its own host. If a storage module of any target host does not satisfy a preset storage condition, the target host sends a memory obtaining request to a switch. The switch forwards the memory obtaining request to the memory management unit. The memory management unit obtains memory allocation status corresponding to the memory modules and performs address translation on a determined target memory module, and then sends the target memory module after the address translation to the target host to achieve dynamic allocation of memory resources.

Figure 5:
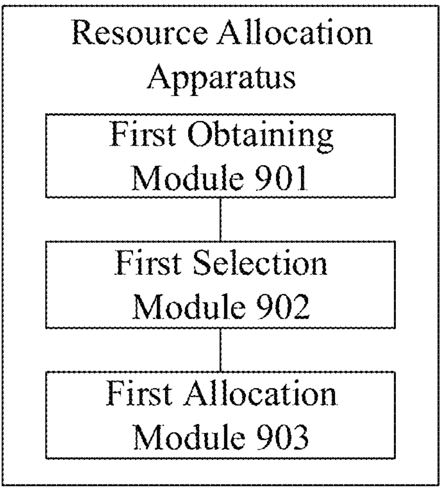
FIG. 5 is a structural diagram of a resource allocation apparatus provided in an embodiment of the present disclosure.

FIG. 5 is a structural diagram of a resource allocation apparatus provided in an embodiment of the present disclosure. As shown in FIG. 5, the apparatus is applied to a memory management unit in a resource allocation system. The apparatus may specifically include:

a first obtaining module 901, configured to, in response to a memory obtaining request forwarded by a switch in the resource allocation system, obtain a required memory capacity and a memory start address carried by the memory obtaining request, where the memory obtaining request is sent by any target host of at least two hosts included in the resource allocation system to the switch;

a first selection module 902, configured to select a target memory module that matches the required memory capacity from at least two memory modules in the resource allocation system based on a memory allocation unit in the resource allocation system; and a first allocation module 903, configured to perform address translation on the target memory module based on a memory address router in the memory allocation unit and the memory start address, and allocate the target memory module after the address translation to the target host.

The embodiment of the present disclosure provides a resource allocation apparatus, in response to the memory obtaining request sent by the target host forwarded by the switch in the resource allocation system, the memory management unit in the resource allocation system obtains the required memory capacity and the memory start address carried by the memory obtaining request, selects the target memory module that matches the required memory capacity from the at least two memory modules in the resource allocation system based on the memory allocation unit in the resource allocation system, performs address translation on the target memory module based on the memory address router in the memory allocation unit and the memory start address, and allocates the target memory module after the address translation to the target host, so as to achieve dynamic resource allocation to the target host. In this way, through the interaction between the memory management unit and the memory allocation unit in the resource allocation system, the rapid allocation of free memory modules in the system may be ensured. Moreover, based on actual memory requirements of the target host, the target memory module that matches the required memory capacity may be determined for the target host, and the target memory module may be allocated to the target host, achieving dynamic allocation of memory resources in the resource allocation system while improving utilization rate of memory resources in the resource allocation system and reducing the use cost of the memory resources.

In some embodiments of the present disclosure, the memory management unit is connected to a status obtaining interface in the memory allocation unit based on a universal asynchronous receiver/transmitter (UART), where the apparatus may further include:

a second obtaining module, configured to obtain temperature information corresponding to the memory allocation unit based on the status obtaining interface.

In some embodiments of the present disclosure, the apparatus may further include:

a first sending module, configured to in response to the temperature information satisfying a preset temperature condition, send a first target signal to a target fan in the resource allocation system based on a logic unit in the resource allocation system, where the first target signal is configured to obtain rotational speed information corresponding to the target fan; and a second sending module, configured to send a second target signal to the target fan based on the rotational speed information and the temperature information, where the second target signal is configured to adjust a rotational speed of the target fan.

In some embodiments of the present disclosure, the first selection module 902 includes:

a first obtaining submodule, configured to obtain memory allocation status corresponding to respective memory modules in the resource allocation system based on the memory allocation unit in the resource allocation system;

a first determination module, configured to determine one or more memory modules to be allocated and free memory sizes corresponding to the one or more memory modules to be allocated based on the memory allocation status corresponding to the respective memory modules; and a second determination module, configured to in response to a free memory size of a first memory module in the one or more memory modules to be allocated being greater than or equal to the required memory capacity, determine the first memory module as the target memory module.

In some embodiments of the present disclosure, the first selection module 902 includes:

a third determination module, configured to in response to a memory size of any one of the one or more memory modules to be allocated being less than the required memory capacity, determine designated memory modules as the target memory module, where the designated memory modules include at least two memory modules to be allocated.

In some embodiments of the present disclosure, the first allocation module 903 includes:

a second obtaining submodule, configured to obtain an initial start address, an initial end address, and a target memory size corresponding to the target memory module;

a first determination submodule, configured to determine a target end address based on the target memory size and the memory start address through the memory address router; and a first translation module, configured to translate the initial start address to the memory start address, and translate the initial end address to the target end address.

In some embodiments of the present disclosure, the memory obtaining request carries a host identifier, where the first allocation module 903 includes:

a second determination submodule, configured to determine a target host memory interface connected to the target host from at least two host memory interfaces in the memory allocation unit based on the host identifier;

a third sending module, configured to in response to the memory address router completing the address translation of the target memory module, send the memory start address and the target end address to the target host memory interface through the memory address router.

In some embodiments of the present disclosure, the memory management unit is connected to a configuration interface in the memory allocation unit through a two-wire serial bus, where the apparatus may further include:

a first addressing module, configured to uniformly address the at least two memory modules based on the configuration interface.

In some embodiments of the present disclosure, the apparatus may further include:

a first configuration module, configured to control an initialization unit in the memory allocation unit to perform initialization configuration according to information in a storage processor based on the configuration interface.

In some embodiments of the present disclosure, the memory management unit is connected to a memory resource interface in the memory allocation unit based on a high-speed serial computer expansion bus, where the first obtaining submodule includes:

a third obtaining submodule, configured to obtain the memory allocation status corresponding to the respective memory modules in real time based on the memory resource interface.

In some embodiments of the present disclosure, the first configuration module includes:

a fourth obtaining submodule, configured to in response to power-on of the memory allocation unit being completed, control the initialization unit to obtain initialization information from the storage processor based on the configuration interface; and a first configuration submodule, configured to, based on the initialization information, enable host memory interfaces and memory device interfaces in the memory allocation unit, and set transmission bandwidth information and transmission rate information.

An embodiment of the present disclosure also provides a resource allocation system, including a memory management unit, a memory allocation unit, a memory storage unit, a switch, and at least two hosts;

where the at least two hosts are connected to the switch based on a network, and the at least two hosts are respectively connected to at least two host memory interfaces in the memory allocation unit in one-to-one correspondence based on a compute express link (CXL) bus;

memory device interfaces in the memory allocation unit are connected to the memory storage unit based on the CXL bus;

the memory management unit is connected to the switch based on the network; the memory management unit is connected to a status obtaining interface in the memory allocation unit based on a universal asynchronous receiver/transmitter (UART), the memory management unit is connected to a configuration interface in the memory allocation unit based on a two-wire serial bus, and the memory management unit is further connected to a memory resource interface in the memory allocation unit based on a high-speed serial computer expansion bus.

In an example, the relevant architecture diagram of the resource allocation system in the embodiment of the present disclosure can refer to FIG. 2, and the specific architecture description of the resource allocation system corresponding to FIG. 2 can refer to the aforementioned embodiments. The embodiments of the present disclosure will not be repeated here.

Figure 6:
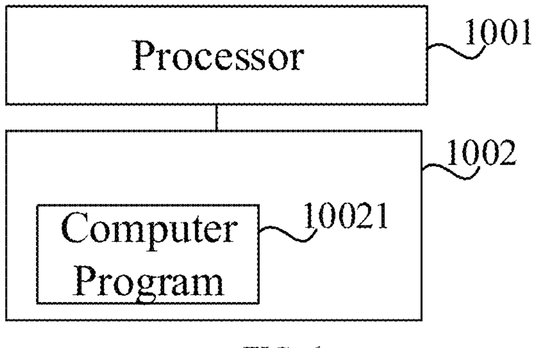
FIG. 6 is a structural diagram of an electronic device provided in an embodiment of the present disclosure.

The present disclosure also provides an electronic device. As shown in FIG. 6, the electronic device includes a processor 1001, a memory 1002, and a computer program 10021 stored on the memory and executable on the processor. When the processor executes the program, the resource allocation method of the aforementioned embodiments is implemented.

The present disclosure also provides a non-volatile readable storage medium, instructions in the non-volatile readable storage medium, when executed by a processor of an electronic device, cause the electronic device to perform the resource allocation method of the aforementioned embodiments.

For the apparatus embodiments, due to their basic similarity with the method embodiments, the description is relatively simple. The relevant contents can be found in the description of the method embodiments.

The algorithm and display provided herein are not inherently related to any particular computer, a virtual system, or other devices. Various general-purpose systems may also be used together based on the demonstration herein. According to the foregoing description, structures required to construct the types of systems are obvious. In addition, the present disclosure is also not directed at any particular programming language. It should be understood that, various programming languages may be used to implement the content of the present disclosure described herein, and the foregoing description for a particular language is for disclosing the optimal implementation of the present disclosure.

In this specification provided herein, a lot of specific details are described. However, it can be understood that, the embodiments of the present disclosure may be implemented without these specific details. In some instances, the well-known methods, structures, and technologies are not shown in detail, to avoid obscuring the understanding for this specification.

Similarly, it should be understood that, to simplify the present disclosure and help understand one or more of the invention aspects, in the foregoing description for the exemplary embodiments of the present disclosure, features of the present disclosure are sometimes grouped together to a single embodiment or figure, or description for the features. However, the disclosed method should not be explained to reflect the following intention: the present disclosure required to be protected requires more features than features recorded clearly in each claim. More specifically, as reflected by the following claims, the invention aspects are less than all features of the single embodiments disclosed above. Therefore, the claims following the specific implementations are clearly combined into the specific implementations, where each claim itself is used as a single embodiment of the present disclosure.

A person skilled in the art may understand that, modules in a device in an embodiment may be adaptively changed and disposed in one or more devices different from those in the embodiment. The modules or units or components in the embodiments may be combined into one module or unit or component, or may be divided into a plurality of submodules or subunits or subcomponents. In addition to at least some mutually exclusive ones in such features and/or processes or units, any combination may be used to combine all features disclosed in this specification (including the appended claims, abstract, and accompanying drawings) and all processes or units of any method or device in the present disclosure. Unless otherwise explicitly stated, each feature disclosed in this specification (including the appended claims, abstract, and accompanying drawings) may be replaced with an alternative feature providing the same, equivalent, or similar objective.

Component embodiments of the present disclosure may be implemented by hardware, or implemented by a software module running in one or more processors, or implemented by a combination thereof. A person skilled in the art should understand that, in practice, a microprocessor or a digital signal processor (DSP) may be used to implement some or all functions of some of all components in the electronic device according to the present disclosure. The present disclosure may be further implemented as some or all devices or apparatus programs used for performing the method described herein. Such programs for implementing the present disclosure may be stored in a computer readable medium, or may have the form of one or more signals. Such signals may be downloaded from an Internet platform, or provided on carrier signals, or provided in any other form.

It should be noted that the foregoing embodiments are descriptions of the present disclosure instead of a limitation on the present disclosure, and a person skilled in the art may design a replacement embodiment without departing from the scope of the appended claims. In the claims, any reference symbol located between brackets should not constitute a limitation on the claims. The word "comprise" does not exclude an element or a step not listed in the claims. The word "a" or "one" located previous to an element does not exclude existence of a plurality of such elements. The present disclosure may be implemented by hardware including several different elements and an appropriately programmed computer. In the unit claims listing several apparatuses, some of the apparatuses may be specifically presented by using the same hardware. Use of the words such as "first", "second", and "third" does not indicate any sequence. These words may be construed as names.

A person skilled in the art may clearly learn that, for simple and clear description, for specific work processes of the foregoing described system, apparatus, and unit, reference may be made to corresponding processes in the foregoing method embodiments, and details are not described herein again.

It should be pointed out that all actions to obtain signals, information, or data in the present disclosure are carried out in accordance with the corresponding data protection regulations and policies of the country where they are located, and with authorization granted by the corresponding device owner.

The above are only examples of the present disclosure and are not intended to limit the present disclosure. Any modifications, equivalent substitutions, and improvements made within the spirit and principles of the present disclosure should be included within the protection scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A resource allocation method, applied to a memory management unit in a resource allocation system, the method comprising:

receiving a memory obtaining request forwarded by a switch in the resource allocation system, wherein the memory obtaining request is sent by any target host of at least two hosts comprised in the resource allocation system to the switch, in response to the memory obtaining request, obtaining a required memory capacity and a memory start address carried by the memory obtaining request;

selecting a target memory module that matches the required memory capacity from at least two memory modules in the resource allocation system based on a memory allocation unit in the resource allocation system; and performing address translation on the target memory module based on a memory address router in the memory allocation unit and the memory start address, and allocating the target memory module after the address translation to the target host;

wherein selecting the target memory module that matches the required memory capacity from the at least two memory modules in the resource allocation system based on the memory allocation unit in the resource allocation system comprises:

obtaining memory allocation status corresponding to respective memory modules in the resource allocation system based on the memory allocation unit in the resource allocation system;

determining one or more memory modules to be allocated and free memory sizes corresponding to the one or more memory modules to be allocated based on the memory allocation status corresponding to the respective memory modules; and determining a free memory size of a first memory module in the one or more memory modules to be allocated being greater than or equal to the required memory capacity, in response to the free memory size being greater than or equal to the required memory capacity, determining the first memory module as the target memory module;

wherein selecting the target memory module that matches the required memory capacity from the at least two memory modules in the resource allocation system based on the memory allocation unit in the resource allocation system further comprises:

determining a memory size of any one of the one or more memory modules to be allocated beingless than the required memory capacity, in response to the memory size being less than the required memory capacity, determining designated memory modules as the target memory module, wherein the designated memory modules comprise at least two memory modules to be allocated;

wherein performing the address translation on the target memory module based on the memory address router in the memory allocation unit and the memory start address comprises:

obtaining an initial start address, an initial end address, and a target memory size corresponding to the target memory module;

determining a target end address based on the target memory size and the memory start address through the memory address router; and translating the initial start address to the memory start address, and translating the initial end address to the target end address.

2. The resource allocation method according to claim 1, wherein the at least two hosts are respectively connected to at least two host memory interfaces in the memory allocation unit in one-to-one correspondence based on a compute express link (CXL) bus, and memory device interfaces in the memory allocation unit are connected to a memory storage unit in the resource allocation system based on the CXL bus.

3. The resource allocation method according to claim 2, wherein the memory storage unit comprises at least two memory modules and at least two memory expander controllers (MXCs), the at least two MXCs are connected to the at least two memory modules in one-to-one correspondence, and the at least two MXCs are configured to perform memory expansion on the at least two memory modules.

4. The resource allocation method according to claim 1, wherein the memory management unit is connected to a status obtaining interface in the memory allocation unit based on a universal asynchronous receiver/transmitter (UART), wherein the method further comprises:

obtaining temperature information corresponding to the memory allocation unit based on the status obtaining interface.

5. The resource allocation method according to claim 4, further comprising:

determining the temperature information satisfying a preset temperature condition, in response to the temperature information satisfying the preset temperature condition, sending a first target signal to a target fan in the resource allocation system based on a logic unit in the resource allocation system, wherein the first target signal is configured to obtain rotational speed information corresponding to the target fan; and sending a second target signal to the target fan based on the rotational speed information and the temperature information, wherein the second target signal is configured to adjust a rotational speed of the target fan.

6. The resource allocation method according to claim 1, wherein the memory obtaining request carries a host identifier, wherein allocating the target memory module after the address translation to the target host comprises:

determining a target host memory interface connected to the target host from at least two host memory interfaces in the memory allocation unit based on the host identifier; and determining the memory address router completing the address translation of the target memory module, in response to the memory address router completing the address translation of the target memory module, sending the memory start address and the target end address to the target host memory interface through the memory address router.

7. The resource allocation method according to claim 1, wherein each of the at least two hosts in the resource allocation system is respectively connected to a target processor through a two-wire serial bus, and the target processor stores a host identifier corresponding to the host connected to the target processor.

8. The resource allocation method according to claim 1, wherein the memory management unit is connected to a configuration interface in the memory allocation unit through a two-wire serial bus, wherein the method further comprises:

uniformly addressing the at least two memory modules based on the configuration interface.

9. The resource allocation method according to claim 8, further comprising:

controlling an initialization unit in the memory allocation unit to perform initialization configuration according to information in a storage processor based on the configuration interface.

10. The resource allocation method according to claim 1, wherein the memory management unit is connected to a memory resource interface in the memory allocation unit based on a high-speed serial computer expansion bus, wherein obtaining the memory allocation status corresponding to the respective memory modules in the resource allocation system based on the memory allocation unit in the resource allocation system comprises:

obtaining the memory allocation status corresponding to the respective memory modules in real time based on the memory resource interface.

11. The resource allocation method according to claim 10, wherein the memory allocation status comprises host information, bandwidth information, and device interface connection status corresponding to one or more allocated memory modules, and the free memory sizes corresponding to the one or more memory modules to be allocated.

12. The resource allocation method according to claim 1, further comprising determining that a storage module corresponding to the target host does not satisfy a preset storage condition and, in response to the storage module corresponding to the target host not satisfying the preset storage condition, sending the memory obtaining request to the switch using the target host.

13. The resource allocation method according to claim 9, wherein controlling the initialization unit in the memory allocation unit to perform initialization configuration according to the information in the storage processor based on the configuration interface comprises:

determining power-on of the memory allocation unit being completed, in response to power-on of the memory allocation unit being completed, controlling the initialization unit to obtain initialization information from the storage processor based on the configuration interface; and based on the initialization information, enabling host memory interfaces and memory device interfaces in the memory allocation unit, and setting transmission bandwidth information and transmission rate information.

14. The resource allocation method according to claim 1, wherein the memory start address is determined based on a storage size of a storage module corresponding to the target host.

15. An electronic device, comprising:

a processor, a memory, and a computer program stored on the memory and executable on the processor, wherein the computer program, when executed by the processor, causes the electronic device to perform the resource allocation method according to claim 1.

16. The electronic device according to claim 15, wherein the at least two hosts are respectively connected to at least two host memory interfaces in the memory allocation unit in one-to-one correspondence based on a compute express link (CXL) bus, and memory device interfaces in the memory allocation unit are connected to a memory storage unit in the resource allocation system based on the CXL bus.

17. The electronic device according to claim 16, wherein the memory storage unit comprises at least two memory modules and at least two memory expander controllers (MXCs), the at least two MXCs are connected to the at least two memory modules in one-to-one correspondence, and the at least two MXCs are configured to perform memory expansion on the at least two memory modules.

18. The electronic device according to claim 15, wherein the memory management unit is connected to a status obtaining interface in the memory allocation unit based on a universal asynchronous receiver/transmitter (UART), wherein the processor is further configured to perform operations comprising:

obtaining temperature information corresponding to the memory allocation unit based on the status obtaining interface.

19. A non-transitory readable storage medium, wherein instructions in the non-transitory readable storage medium, when executed by a processor of an electronic device, cause the electronic device to perform the resource allocation method according to claim 1.

20. A resource allocation system, comprising a memory management unit, a memory allocation unit, a memory storage unit, a switch, and at least two hosts;

wherein the at least two hosts are connected to the switch based on a network, and the at least two hosts are respectively connected to at least two host memory interfaces in the memory allocation unit in one-to-one correspondence based on a compute express link (CXL) bus;

memory device interfaces in the memory allocation unit are connected to the memory storage unit based on the CXL bus;

the memory management unit is connected to the switch based on the network; the memory management unit is connected to a status obtaining interface in the memory allocation unit based on a universal asynchronous receiver/transmitter (UART), the memory management unit is connected to a configuration interface in the memory allocation unit based on a two-wire serial bus, and the memory management unit is further connected to a memory resource interface in the memory allocation unit based on a high-speed serial computer expansion bus;

wherein the memory management unit is configured to: in response to a memory obtaining request forwarded by the switch in the resource allocation system, obtain a required memory capacity and a memory start address carried by the memory obtaining request, wherein the memory obtaining request is sent by any target host of the at least two hosts comprised in the resource allocation system to the switch;

the memory management unit is further configured to select a target memory module that matches the required memory capacity from at least two memory modules in the resource allocation system based on the memory allocation unit in the resource allocation system;

the memory management unit is further configured to perform address translation on the target memory module based on a memory address router in the memory allocation unit and the memory start address, and allocate the target memory module after the address translation to the target host;

the memory management unit is further configured to:

obtain memory allocation status corresponding to respective memory modules in the resource allocation system based on the memory allocation unit in the resource allocation system;

determine one or more memory modules to be allocated and free memory sizes corresponding to the one or more memory modules to be allocated based on the memory allocation status corresponding to the respective memory modules; and in response to a free memory size of a first memory module in the one or more memory modules to be allocated being greater than or equal to the required memory capacity, determine the first memory module as the target memory module;

the memory management unit is further configured to:

in response to a memory size of any one of the one or more memory modules to be allocated being less than the required memory capacity, determine designated memory modules as the target memory module, wherein the designated memory modules comprise at least two memory modules to be allocated;

the memory management unit is further configured to:

obtain an initial start address, an initial end address, and a target memory size corresponding to the target memory module;

determine a target end address based on the target memory size and the memory start address through the memory address router; and translate the initial start address to the memory start address, and translate the initial end address to the target end address.

* * * * *